United States Patent
Endres et al.

(10) Patent No.: US 7,523,024 B2
(45) Date of Patent: Apr. 21, 2009

(54) MODELING GEOLOGIC OBJECTS IN FAULTED FORMATIONS

(75) Inventors: David Mack Endres, Leander, TX (US); Horacio R Bouzas, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 537 days.

(21) Appl. No.: 10/151,473

(22) Filed: May 17, 2002

(65) Prior Publication Data

US 2003/0216897 A1 Nov. 20, 2003

(51) Int. Cl.
G06G 7/48 (2006.01)

(52) U.S. Cl. ............................................. 703/6; 703/10
(58) Field of Classification Search ...................... 703/6, 703/10; 702/2
See application file for complete search history.

(56) References Cited

U.S. PATENT DOCUMENTS

| | | | |
|---|---|---|---|
| 4,991,095 A | 2/1991 | Swanson | |
| 6,128,577 A * | 10/2000 | Assa et al. | 702/2 |
| 6,370,491 B1 | 4/2002 | Malthe-Sorenssen | |
| 2002/0059048 A1 | 5/2002 | Hardy et al. | |

OTHER PUBLICATIONS

John Wickham et al.; "Restoration of structural cross-sections", 1997, Journal of Structural Geology, vol. 19, No. 7, pp. 975-986.*

Judd Robbins, "Mastering DOS", second edition, 1988, Sybex, pp. 110-112.*

Alms, R. et al., "Space-time modelling of the Lower Rhine Basin supported by an object-oriented database", Phys. Chem. Earth, 23, 1998.

Buddin, T.S. et al., "A senstitivity analysis of 3-dimensional restoration techniques using vertical and inclined shear constructions", Tectonophysics, 269, 1997, pp. 33-50.

Egan, S.S. et al., "Three-Dimensional Modelling and Visualisation in Structrual Geology: New Techniques for the Restoration and Balancing of Volumes", In: Proceeings of the 1996 Geoscience Information Group Conference on Geological Visualisation—the Intelligent Picture? Electronic Geology special vol. 1, paper 7, Oct. 1996, pp. 67-82.

Foot, J.G. et al., "The 3-Dimensional Modelling of Large-Scale Isolated Inhomogeneities in a North Sea Reservoir Sand Body", SPWLA 37th Annual Logging Symposium, Jun. 16-19, 1996.

(Continued)

*Primary Examiner*—Paul L Rodriguez
*Assistant Examiner*—Russ Guill
(74) *Attorney, Agent, or Firm*—Robert P. Lord; Bryan P. Galloway

(57) ABSTRACT

A system and method of modeling a geological body in a contemporary formation is presented that includes constructing a geological object based on an original depositional paleo-space associated with the contemporary formation, and copying the geological object, transforming the copy of the geological object based on a deformation model of the contemporary formation using acquired data, the transforming allowing modeling of the deformed formation geological body and a lateral extent spanning a plurality of fault blocks.

19 Claims, 17 Drawing Sheets

OTHER PUBLICATIONS

Gibbs, A.D. et al., "3D Kinematic Structural Restoration and its Impact on Reduction of Risk—New Techniques Arising from Commercialisation of Software Developed for Three Dimensional Volume Balanced Analysis of Geological Structure", in The Strategic Importance of Oil and Gas Technology, Edinburgh, 1996, pp. 272-282.

Gibbs, A.D., "Balanced cross-section construction from seismic sections in areas of extensional tectonics", Journal of Structural Geology, vol. 5, No. 2, 1983, pp. 153-160.

Gibbs, A.D., "Towards a Three Dimensional Approach to Restoration and Modelling of Geological Structure", 4th EC Symposium, Oil and Gas in a Wider Europe, Brussels, 1992, pp. 211-220.

Griffiths, P.A. et al., "The development of a new technique for automated 3D-restoration for complex structural interpretations", Poster presentation, AAPG, San Antonio, 1999.

Jessell, M., "Three-dimensional geological modelling of potential-field data", Computers & Geosciences, vol. 27, No. 4, May 2001.

Jentzsch, T. et al., "From palinspastic reconstructions to kinematic basin models", 19th GOCAD Meeting, Nancy, France, 1999.

Leger, M., et al., "A least-squares method for multisurface unfolding", Journal of Structural Geology, vol. 19, No. 5, 1997, pp. 735-743.

Levy et al., "Unfolding a horizon: new capabilities and applications", G0CAD Consortium Annual Meeting, Jun. 19, 2002.

Rouby, D. et al, "3-D Restoration of Complexly Folded and Faulted Surfaces Using Multiple Unfolding Mechanisms", AAPG Bulletin, vol. 84, No. 6, Jun. 2000, pp. 805-829.

Rouby, D. et al., "Least-squares palinspastic restoration of regions of normal faulting—application to the Campos basin (Brazil)", Tectonophysics, 221, 1993, pp. 439-452.

Rouby, D. et al, "Extension, Displacement, and Block Rotation in the Larger Gullfaks Area, Northern North Sea: Determined from Map View Restoration," AAPG Bulletin, vol. 80, No. 6, Jun. 1996, pp. 875-890.

Williams, G.D., et al., "Restoration and balance of complex folded and faulted rock volumes: flexural flattening, jigsaw fitting and decompaction in three dimensions", Tectonophysics, 273, 1997, pp. 203-218.

Hoffman, K. S. et al., "Horizon modeling using a three-dimensional fault restoration technique" (SPE 56445), SPE Annual Technical Conference and Exibition, Houston, TX, Oct. 3-6, 1999.

Hoffman, K. S. et al., Reservoir characterization using three-dimensional fault restoration, 70th Annual International Meeting: Society of Exploration Geophysicists, 2000, pp. 2154-2157.

Schlumberger: Geoframe 4.0 Standard Data Modeling (SDM) User's Guide 'Online!' 2001 (Schlumberger XP002251295, 99-118).

* cited by examiner

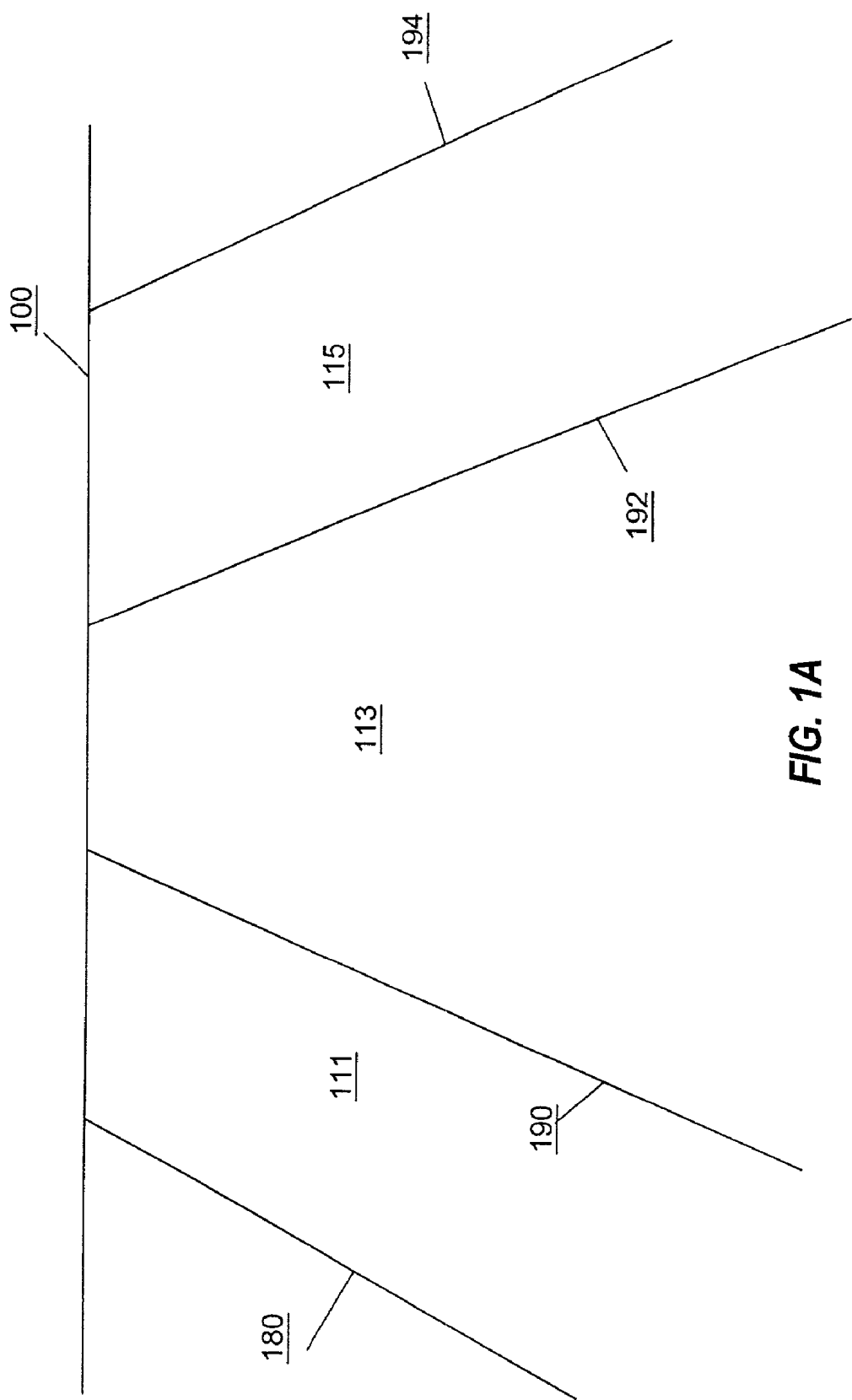

MODELING GEOLOGIC OBJECTS IN FAULTED FORMATIONS

BACKGROUND OF THE INVENTION

1. Field of the Invention

The present invention generally relates to the investigation and characterization of geologic formations, and more particularly to a method and system for modeling geological objects, or geological bodies, in regions which have a deformation such as folding, faulting, fracturing, shearing, compression, or extension.

2. Description of the Related Art

Geologic data are used for land-management decision-making, engineering design, in the hunt for mineral resources, and for scientific research. Geologists have devised a wide variety of techniques to collect and analyze data relating to the structure and content of earth formations in the continuing search for underground assets, particularly hydrocarbons such as oil and gas. These techniques include, for example, seismic sensing, and downhole logging. In seismic sensing, a sound source is placed at the surface, or at an underground location, and an array of seismic sensors collect information on the resulting sonic waves. In downhole logging, instruments (e.g., magnetic induction sensors or gamma-ray sensors) are attached to a wellbore tool that transmits sensed data up the wireline or via another communication channel to a data processing system. Analysis of the information found using these different techniques reveals the structures of subsurface formations, and the nature of the formations, i.e., porosity, density, etc., all of which is useful in determining the rock constituents and whether hydrocarbons are present.

Analysis of geologic data often exposes underground structures such as fluvial channels and levees, windblown dune sand bodies, or reef structures. These various sedimentary features are commonly referred to as geological bodies, also known as geological objects. More generally, geological bodies are three-dimensional depositional structures in subsurface geology, which are more localized than the remainder of the depositional formations. It is known to model geological bodies mathematically (particularly using computer programs) in a three-dimensional structural model by a closed three-dimensional boundary surface. Modeling of subsurface structures can assist in the search for and extraction of underground assets. For example, flow behavior, connected volume and overall performance of hydrocarbon reservoirs are all highly dependent on the petrophysical properties of geological bodies.

An important concept in analyzing the information contained in geologic models is the distinction between a description of a rock volume, and a description of a surface. Rock units describe the characteristics of a volume of rock. Surficial geologic units describe the characteristics of the boundary layer between rock volumes with different properties or between solid earth and the atmosphere or the hydrosphere. Surficial units may describe the lithology of deposits to a depth that is small relative to the horizontal extent of the model, or may relate to surface morphology, age (as opposed to deposit age), or depositional environment. To a geologist interested in the processes and characteristics of the earth subsurface, the surfaces in the model represent boundaries of volumes in the model. A geologist interested in the rock bodies that compose the earth uses the three dimensional geometry of the boundary surfaces, to understand the formation.

Geological bodies may be found in a region having some deformation, such as that caused by faulting. In such a case, a structural model might consist of several three-dimensional fault blocks delimited by fault surfaces and, within the fault blocks, block units further delimited by depositional horizons and unconformities. As used herein, a depositional horizon, or horizon, is a surface delimiting depositional rock volumes; and an unconformity refers to an erosional surface.

A geologist requires an understanding of relevant deformation processes that have affected a region. Deformation processes include the growth of folds or faults in three dimensions, as well as developed spatial relationships between the deformation and sedimentation.

Accurate characterization and modeling of geological objects requires an understanding of the shape and location of the objects at the time of their deposition prior to folding and faulting. A deposition-time model, or a model of a geological object at the time of deposition, is called a paleo-space model. Once a geological object has been modeled in paleo space, it is necessary to transform the geological object from paleo space to the contemporary space and morphology; in particular, the deformation (e.g., folding and faulting) known to have affected the contemporary setting must be applied to the objects modeled in paleo space. The transformation between paleo space and contemporary space is necessary to determine an estimate of surface strains, displacements and faults so that the contemporary shape of the geological bodies can be extrapolated from the spatially limited samples represented by well log data. Present techniques for manual and statistical generation of geological bodies support their construction only in unfaulted settings (e.g., layer-cake models). In faulted settings, a geological body may have to be modeled multiple times, once in each containing fault block, with a different deformed shape in each block. Currently, no tool available permits modeling of folding after the deposition of the geological body, except for the FluvSim™, a fluvial simulation geostatistical package available in Modeling Office, GeoFrame 4.0™.

One tool that is used for modeling geologic formations is the Geoframe™ Modeling Office marketed by Schlumberger. As implemented in the Geoframe™ GF4 Modeling Office, geological bodies are first constructed in the contemporary setting, thereafter deformed to conform to a datum horizon, and then trimmed using a non-destructive focused classify operation to fit within a specified block unit. Defining a geological body that spans multiple block units remains tedious because the geological body must be remodeled for each block unit. This is problematic when a three dimensional geological body has a lateral extent spanning multiple fault blocks in a three dimensional structural model. In cases spanning multiple fault blocks, prior art methods require that the feature must be modeled separately in each fault block. In prior art methods, each fault is extrapolated past the boundaries of the fault block and a classify technique is applied. The classify technique compares two sets of geometries to classify the points of the one set with respect to the points of the other according to whether the points of one geometry are inside, on, or outside the other geometry. According to the focused classify technique, a particular sub-volume of a model, for example a particular block unit or fault block is focused upon, as opposed to a classify of a surface or geological object against all of the volumes in a model. This "focused classify" of the extrapolated fault surface is performed upon a fault block that is a target of investigation, referred to as a "target fault block." As a result of a focused classify one or more split fault blocks can be further subdivided by additional faults. Limited post-depositional deformation of the geological body can be captured by making the geological body shape conform to one or two controlling surfaces, but these must be single-valued height fields so general deformations are not supported in the current art.

There are many approaches to restoring geological horizons in two-dimensional section or map views, or in three dimensions. The three-dimensional techniques, in particular, allow the user to derive a paleo-space model from a three dimensional structural model. Most approaches to paleo-space modeling (also referred to as "palinspastic reconstruction") are focused on building balanced section views of the paleo-space model by transforming corresponding two-dimensional sections of the contemporary model. These section views can be interpolated to provide a corresponding three dimensional paleo-space model, but such interpolation is often inaccurate, particularly with regard to strike-slip movements perpendicular to the plane of the section. Another tool, the GeoQuest™ GeoViz™ system (also marketed by Schlumberger, Inc.), supports the flattening of three-dimensional seismic data on a given horizon for visualizing and interpreting seismic data in a three-dimensional setting. However, the transformation is not applied to faulted structural models. GeoViz™ advantageously combines geophysical, geological, petrophysical and reservoir data, allowing the viewing of a true perspective of geospatial relationships.

One recent publication which addresses the restoration of folded and faulted three-dimensional models is "3-D Restoration of Complexly Folded and Faulted Surfaces Using Multiple Unfolding Mechanisms," Rouby et al., Amer. Assoc. Petroleum Geologists Bulletin v. 84, no. 6, pp. 805-829 (June 2000). The method therein described performs restorations on sets of stratigraphic horizons defined in three dimensions as irregular triangular networks (triangulated surfaces), with the unfaulting and unfolding as separate steps. Starting at the deformed state, the method first unfolds the horizon by choosing among three deformation mechanisms. After unfolding, unfaulting is performed in a map view. Before unfaulting, normal faults appear as gaps separating fault compartments. To invert the displacement on the fault, the gaps are closed by rigid-body motion of the fault compartments. The difference between the deformed and the restored state gives the three-dimensional finite displacement field and the directions of slip on the faults. Another approach to restoration is disclosed in "Unfolding a Horizon: New Capabilities and Applications," Levy et al., GOCAD Consortium Annual Meeting (June 2000). According to that technique, a surface is unfolded based on specific surface parameterization. The parameterization of a surface is a one-to-one transform function putting a surface in a three dimensional domain in correspondence with a surface in a two dimensional domain. The Move3D (Midland Valley Consultants) system provides restoration techniques for folded and faulted models and supports paleo-transformation of data from geological measurements. The system also provides inverse paleo-transformation from the paleo-space model to the contemporary structural model. Although any of these approaches is suitable for the construction of a paleo-model, none provides a mechanism for modeling of deformation after the deposition of a geological body and focused classify of the deformed body.

In light of the foregoing, it would be desirable to devise an improved method of modeling a geological object in a formation that has been deformed by, e.g., faulting and folding. It would be further advantageous if the method could preserve the topology of the volume entities, and consistently transform all data positioned on or in the volume entities when transforming from contemporary to paleo space.

SUMMARY OF THE INVENTION

Accordingly, a system and method of modeling geological objects in volume of interest is provided. The system and method can be applied to geological objects situated in deformed regions. The system and method applies a set of paleo-transforms to a volumetric structural model and associated data representing the contemporary setting, building geological objects in the paleo-setting and applying another set of inverse paleo-transformations to the geological objects defined manually or stochastically in the paleo setting to obtain their contemporary setting and morphology and trimming the geological objects to fit in each contemporary fault block. The solution models the geological bodies in an original, e.g., unfaulted, unfolded paleo-space model obtained by applying one or more restoration transformations to each of the fault blocks or block units in a contemporary structural model as well as to other data obtained by measurement of properties of the contemporary geology. Further, an embodiment provides a mechanism for modeling of deformation subsequent to the deposition of a geological body. More particularly, embodiments are directed to a method of modeling a geological body in a contemporary formation using data acquired from the formation and stored in a data processing system. The method includes constructing a geological object based on an original depositional paleo-space associated with the contemporary formation, and transforming the geological object based on a deformation model of the contemporary formation using the acquired data.

An embodiment is directed to techniques of structural model assembly and to the construction of geological bodies in paleo-space and their subsequent insertion in a contemporary structural method. The method and system applies a set of paleo-transforms to a volumetric structural model and associated data representing the contemporary setting, building geological object in the paleo-setting and applying another set of inverse paleo-transformations to the geological objects defined (either manually or stochastically) in the paleo setting to obtain their contemporary setting and morphology and trimming the geological objects to fit in each contemporary fault block.

In one embodiment, the solution models the geological bodies in an original, e.g., unfaulted, unfolded paleo-space model which is obtained by applying one or more restoration transformations (called paleo-transforms) to each of the fault blocks or block units in a contemporary structural model as well as to other data obtained by measurement of properties of the contemporary geology. Geological bodies are constructed by fitting the bodies to the paleo-transformed data either manually or by applying statistical algorithms in the paleo-space model. A copy of each geological body is inverse paleo-transformed, for each block unit it intersects and it is inserted in the given block unit with a "focused classify" technique. The embodiment is not limited to use a single paleo-transform. The paleo-transform action may be specific to each fault block as in the case of a rigid bulk transformation to pack fault blocks or to each point on the boundary of each block unit as would be required to restore a folded unit.

Given a set of paleo-transforms, the process of building a model in paleo-space involves transforming one or more geological structures from their contemporary shape and setting, as inferred from data acquired by seismic, drilling, or wireline sensor, to their setting and morphology at some time in the past. Other data, such as borehole surveys and wireline logs, can also be so transformed to provide a context for interpretation in the paleo model. Geological bodies such as reefs and sand bodies can then be interpreted in the paleo-model by referencing the other transformed objects and data. Another (inverse) transformation is applied to define the contemporary setting and morphology of geological objects interpreted in paleo-space. For each block unit that the geological body intersects in paleo-space, a copy of the geological body is separately inverse transformed and trimmed to fit entirely inside the block unit in contemporary model. If the paleo-transform performs unfolding of the block unit, the inverse paleo-transform will re-impose the folding on the geological body.

The above as well as additional objectives, features, and advantages of the present invention will become apparent in the following detailed written description.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1A is a sectional view from a three dimensional model in which a volume of interest (VOI) within a geologic region is defined in accordance with one implementation of the present invention.

DETAILED DESCRIPTION

The present invention is directed to a method of modeling geological objects, or geological bodies, in regions which have experienced some sort of deformation. As used herein, the term "deformation" refers (without limitation) to folding, faulting, fracturing, shearing, compression, and/or extension. In the embodiments described below, investigations concern a formation subjected to both folding and faulting.

A modeling process according to an embodiment includes preparing a model as is known in the art. More particularly, referring to FIG. 1A, a formation is shown with fault lines 180, 190, 192 and 194 that are shown below a surface 100. The geological body shown in FIG. 1A can be a volume of interest (VOI) for which study is indicated. The fault lines through the VOI are said to define fault blocks 111, 113 and 115. The technique of designating fault lines through a VOI is referred to as fault splitting, wherein the faults separate the VOI into fault blocks.

Figure 1B:
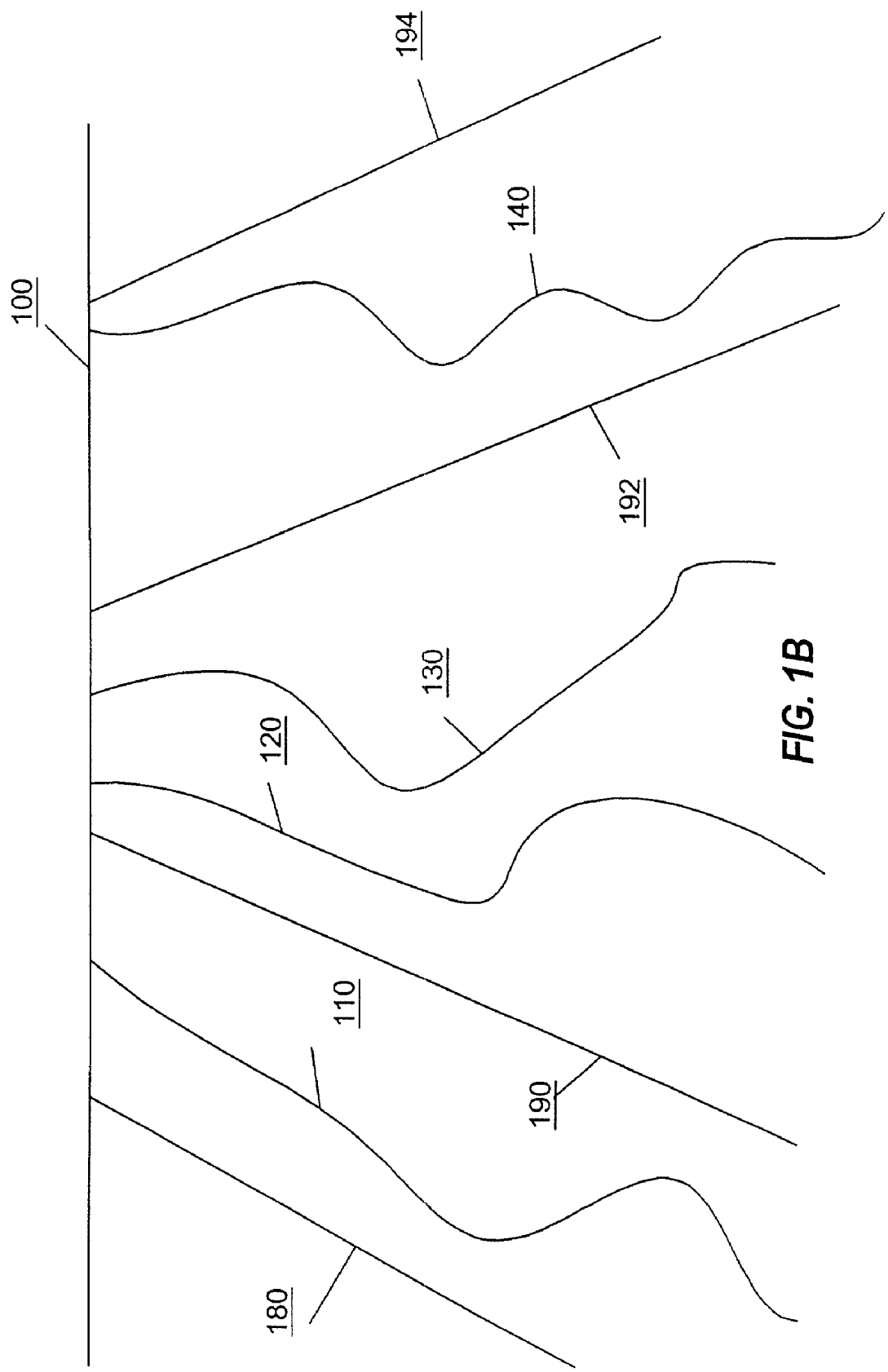
FIG. 1B is a sectional view from a three dimensional model showing a volume of interest (VOI) and wellbores within a geologic region in accordance with one implementation of the present invention.

The fault blocks may or may not contain one or more wellbores. For example, FIG. 1B shows four wellbores 110, 120, 130 and 140 that are also present in the geological body. The fault blocks are 111, 113 and 115. Fault block 111 includes one wellbore; fault block 113 includes two wellbores; and fault block 115 includes one wellbore.

Figure 1C:
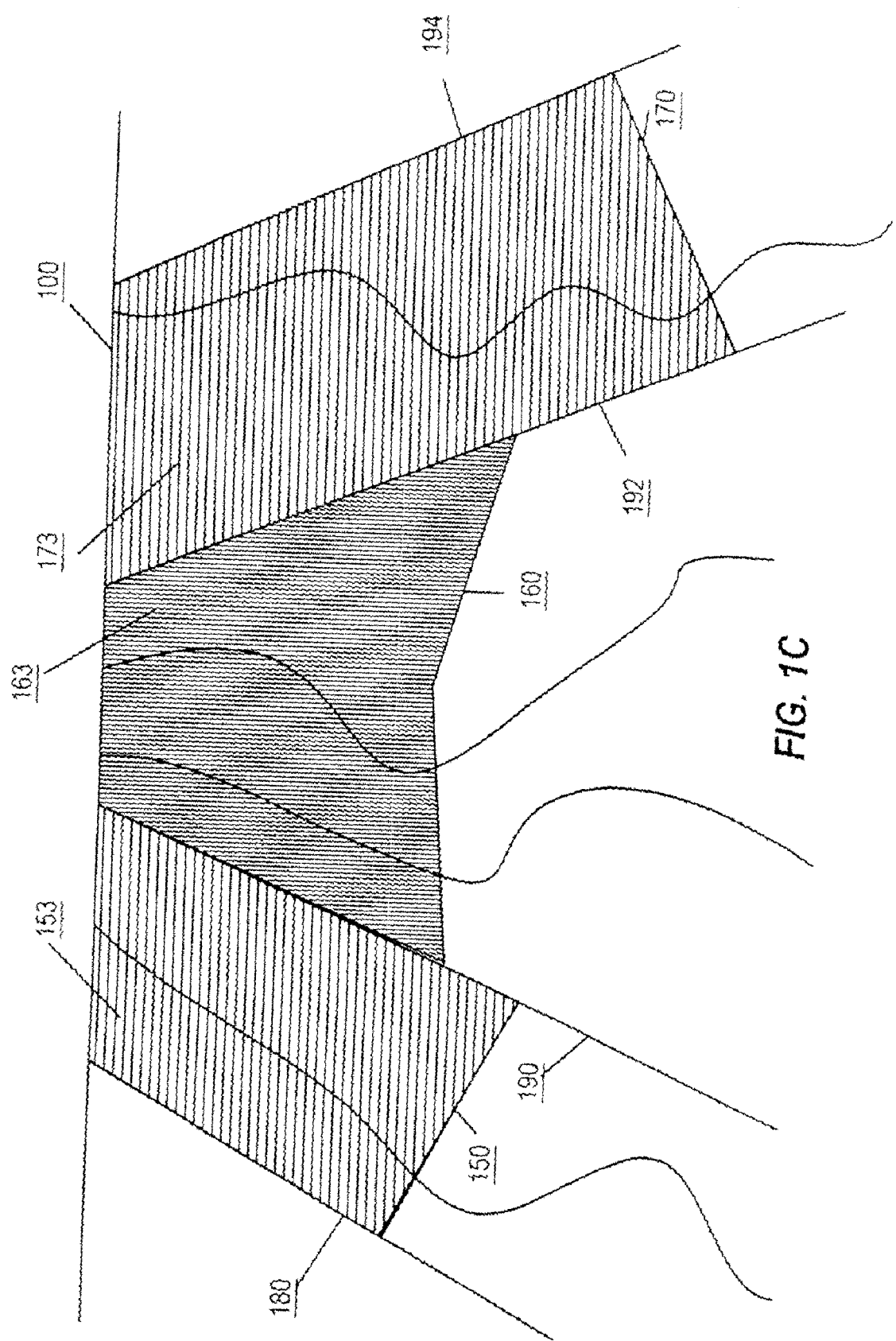
FIG. 1C is a sectional view from a three dimensional model showing a volume of interest (VOI), wellbores and a horizon made up of three horizon patches within a geologic region in accordance with one implementation of the present invention.

To build a structural framework model, a geologist partitions the chosen VOI into a set of blocks units by identifying one or more horizons through the VOI. For example, FIG. 1C shows a horizon including horizon patches 150, 160 and 170 through the geological body. The horizon patches together form a single horizon through the VOI. The resulting model is referred to as a structural framework model, as is known in the art. The horizon patches 150, 160 and 170 each designate a block unit. Classifying horizon patches in each fault block produces multiple block units. Block units shown in FIG. 1C include the shaded areas 153, 163 and 173.

Figure 2A:
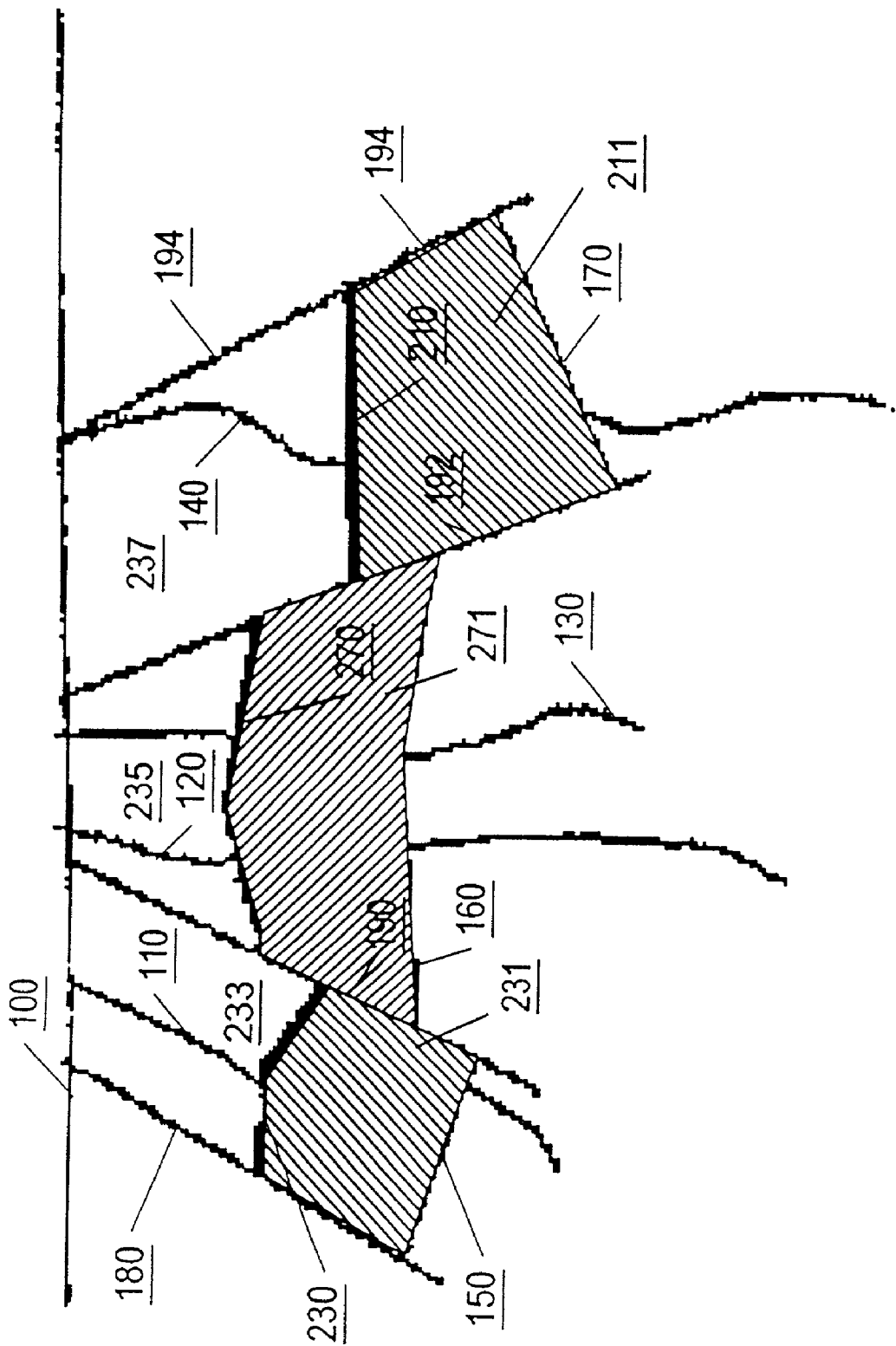
FIG. 2A is a sectional view from a three dimensional model in which a contemporary structural model shows three block units in accordance with one implementation of the present invention.

Referring now to FIG. 2A, a second horizon composed of three horizon patches is shown, including horizon patches 230, 270 and 210. The second horizon and the first horizon both run through the VOI. Adding the second horizon defines block units for the VOI. For example, the areas shaded in FIG. 2A, areas 231, 271 and 211, identify three block units. The areas in each fault block above the second horizon identify three additional block units designated by areas 233, 235 and 237.

Figure 2B:
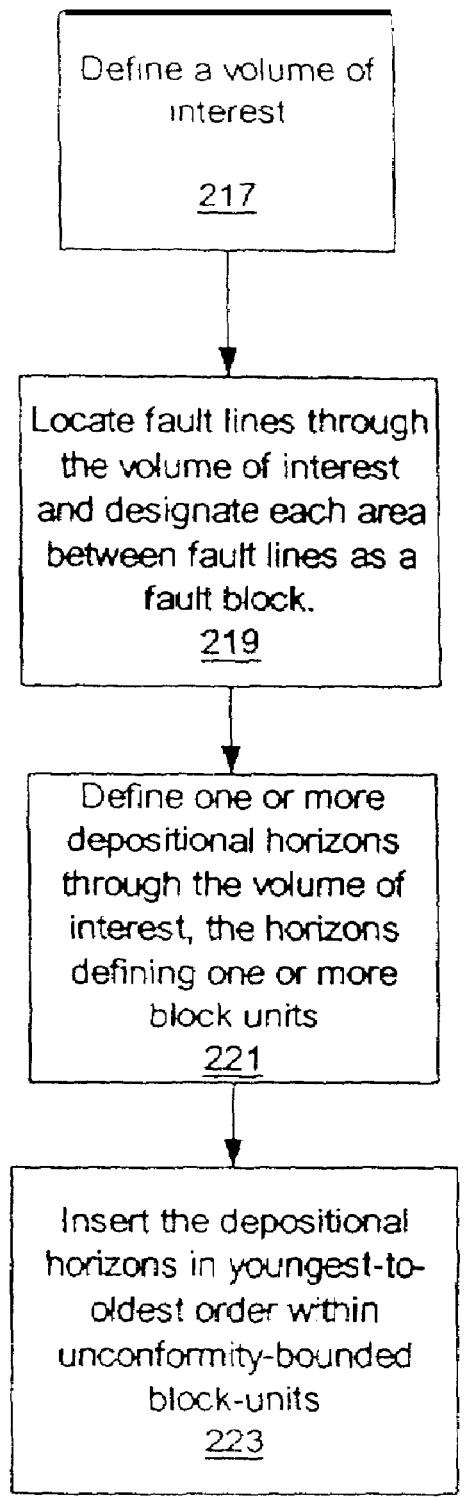
FIG. 2B is a flow diagram illustrating a method of building a contemporary structural model in accordance with an embodiment of the present invention.

Referring to FIG. 2B, a flow diagram illustrates a method for building a structural framework model as illustrated in FIGS. 1A, 1B, 1C and 2A and the accompanying text. Specifically, the method includes, in block 217, defining a volume of interest. Block 219 directs locating fault lines through the volume of interest and designating each area between fault lines as a fault block. Block 221 directs defining one or more depositional horizons through the volume of interest, the horizons defining one or more block units. Block 223 directs inserting the depositional horizons in youngest-tooldest order within unconformity-bounded block-units. Surface data points lying inside a fault block under investigation can be isolated and extrapolated past the boundaries of the block unit under investigation.

FIG. 2B illustrates one method for building a structural framework model for modeling geologic structures that provides for organizing geologic data into several subregions, and classifying a feature (i.e., geological object) into a subset of the subregions. Material properties can be assigned to each of the subregions. A portion of the feature that falls within the subset can be preserved, and a portion of the feature that falls outside the subset, can be trimmed or discarded. Data associated with the structural framework model can be further adjusted by topologically editing geometrical elements of the model. The method illustrated in FIG. 2B can be used to build a fault block model and a contemporary structural model via using the Geoframe™ Modeling Office Structural Model Assembly (SMA).

Figure 3A:
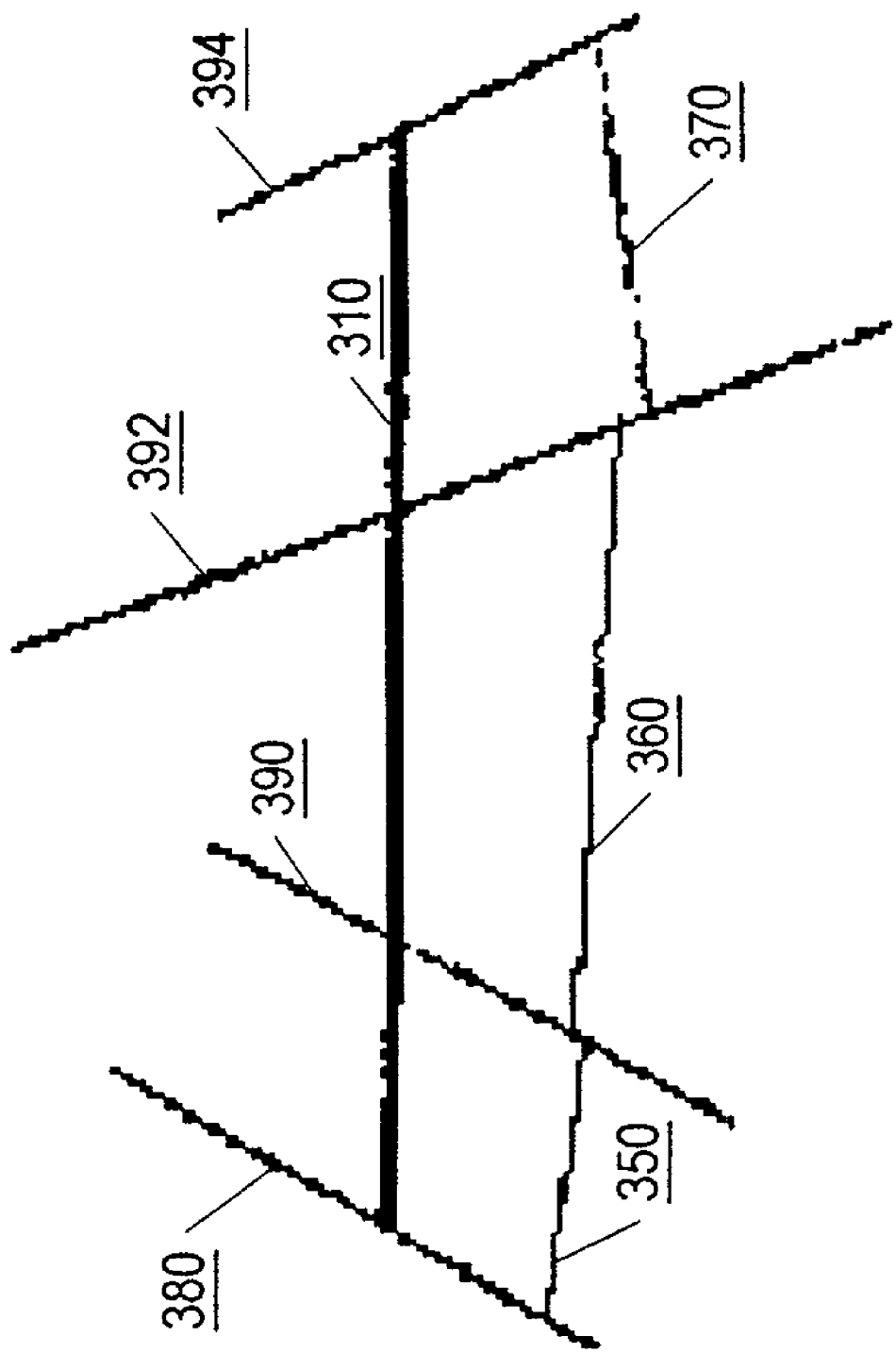
FIG. 3A is a sectional view from a three dimensional model in which an original depositional paleo-space model associated with the contemporary formation of FIG. 2A is constructed, in accordance with one implementation of the present invention.
Figure 3B:
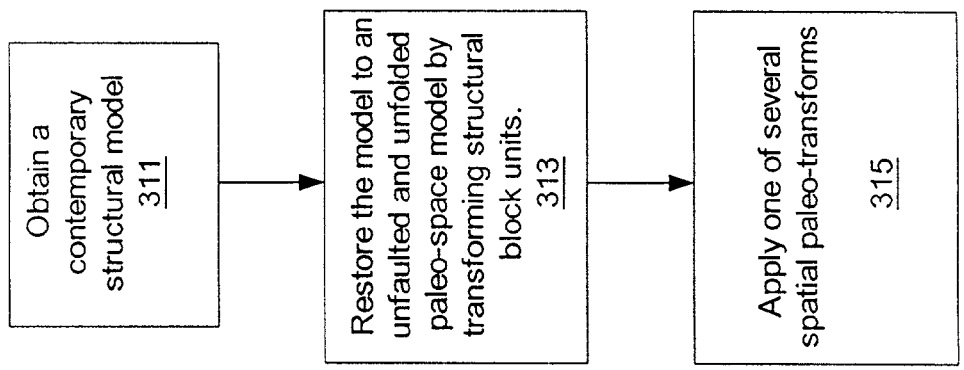
FIG. 3B is a flow diagram illustrating a method for creating the depositional paleo space structural model in accordance with an embodiment of the present invention.

Referring to FIG. 3A, a depositional paleo space structural model according to an embodiment is illustrated that is associated with a contemporary formation. FIG. 3B provides a flow diagram of a method for creating the depositional paleo space structural model of FIG. 3A. More particularly, block 311 provides for obtaining a contemporary structural model. Block 313 provides for restoring the model to an original, e.g., an unfaulted and unfolded paleo-space model by transforming structural block units. For example, block units appropriate for transforming can include the block units defined by (1) lines 350, 380, 390, and 310; (2) lines 390, 360, 392 and 310; and (3) lines 392, 370, 394 and 310. These block units can be transformed to paleo space on a new horizon datum. The new horizon datum is now represented by line 310 in bold. Block 315 provides for applying one of several spatial paleo-transforms.

To transform between contemporary and paleo space, there are a number of different types of paleo transforms that can be applied and their inverses. In an illustrative example, three different cases of transforms can be defined. In the first case (Case 1), no folding is present, and a bulk transformation may be applied to each block to rotate the datum horizon to horizontal and to pack the block against other blocks to minimize space and overlaps between the blocks. Such a transformation is a function of a block identifier (ID). In the second case (Case 2), only moderate deformation is present (surfaces are single-valued height fields), and a transformation may be used which translates each point on the datum horizon to horizontal with a vertical move. Case 2 is illustrated in FIG. 2A. Such a transformation is a function of the x- and y-coordinates as well as the block ID for each block unit. The points on the non-datum horizon boundaries of the fault block are transformed by interpolating the datum horizon transformation to the x-y position of the point in question. In the most general case (Case 3), an arbitrarily complex deformation of the block unit requires a paleo-transform that is a function of the x-, y- and z-coordinates, as well as the block ID. These transforms are described in greater detail in Griffiths, P. A., Gibbs, A. D. and Osfield, R . . . and Gibbs, "The development of a new technique for automated 3 D-restoration for complex structural interpretations," Poster presentation, AAPG, 1999, and in Gibbs, A. D., "Balanced cross-section construction from seismic sections in areas of extensional tectonics", Journal of Structural Geology, Vol. 5, No. 2, pp. 153-160, 1983, both incorporated herein by reference.

Figure 4:
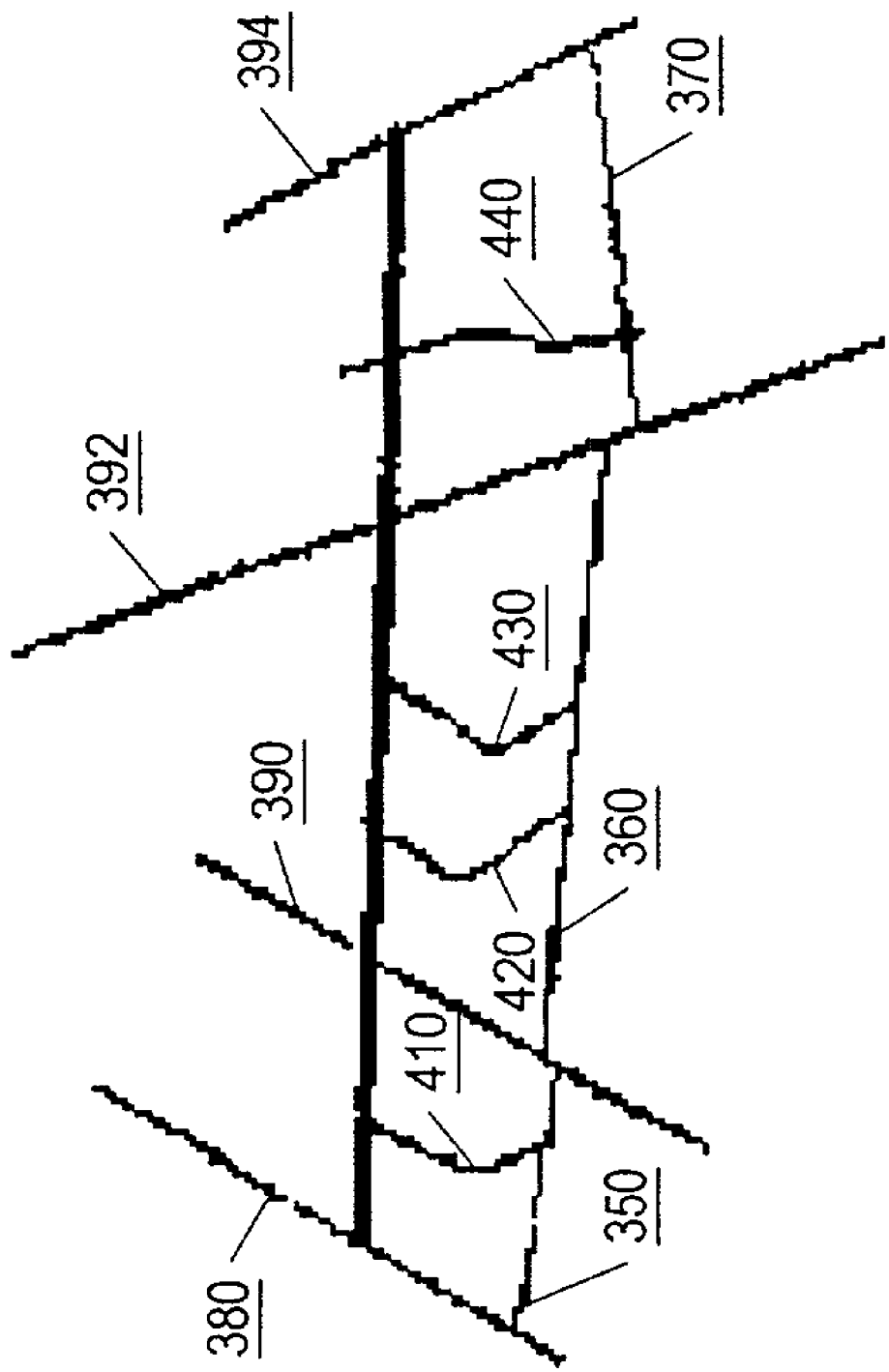
FIG. 4 is a sectional view from a three dimensional model in which spatial data from the contemporary structure is transformed to the paleo-space constructed in FIG. 3, in accordance with one implementation of the present invention.

Referring to FIG. 4, the wellbores shown in FIG. 1B, transformed in paleo-space are shown in the block units defined in FIG. 3. The paleo-space wellbores are shown as lines 410, 420, 430 and 440. A method according to an embodiment provides for transforming data to paleo-space as illustrated. The paleo-space derived and shown in FIG. 3A is used to record the transform and the inverse transform for every model point that is transformed. For Case 1, the transform is associated with the block unit volume as a material property. For Case 2, the transform is associated as a material property with the block unit bounding surface which forms part of the datum horizon. For Case 3, the transform is associated as a material property on every vertex of the bounding surfaces of the volume, and with the block unit volume cells as a three dimensional property distribution, for example, as a three dimensional grid. In a similar fashion, the inverse paleo-transform is associated with each point in the paleo-space model or it can be derived by mathematical inversion of the paleo-transform matrix. The graphical representation of ancillary spatial data (such as well logs, seismic images and LWD borehole images) can also be transformed. According to one embodiment, the block units containing the data are identified by computing the non-destructive intersection of the data spatial loci with the block units of the model. The portion of the data that lies inside a given fault block is then transformed to paleo space by interpolating and applying the paleo transform for the given block, as previously recorded.

Figure 5A:
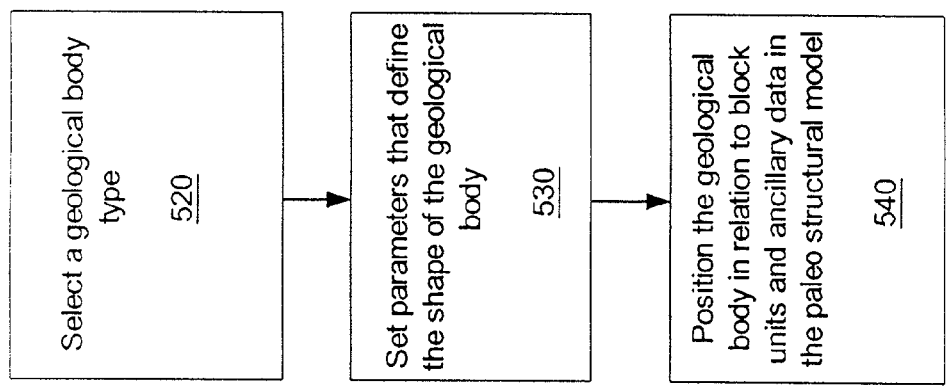
FIG. 5A is a flow diagram illustrating a method for modeling a fluvial channel in paleo space.
Figure 5B:
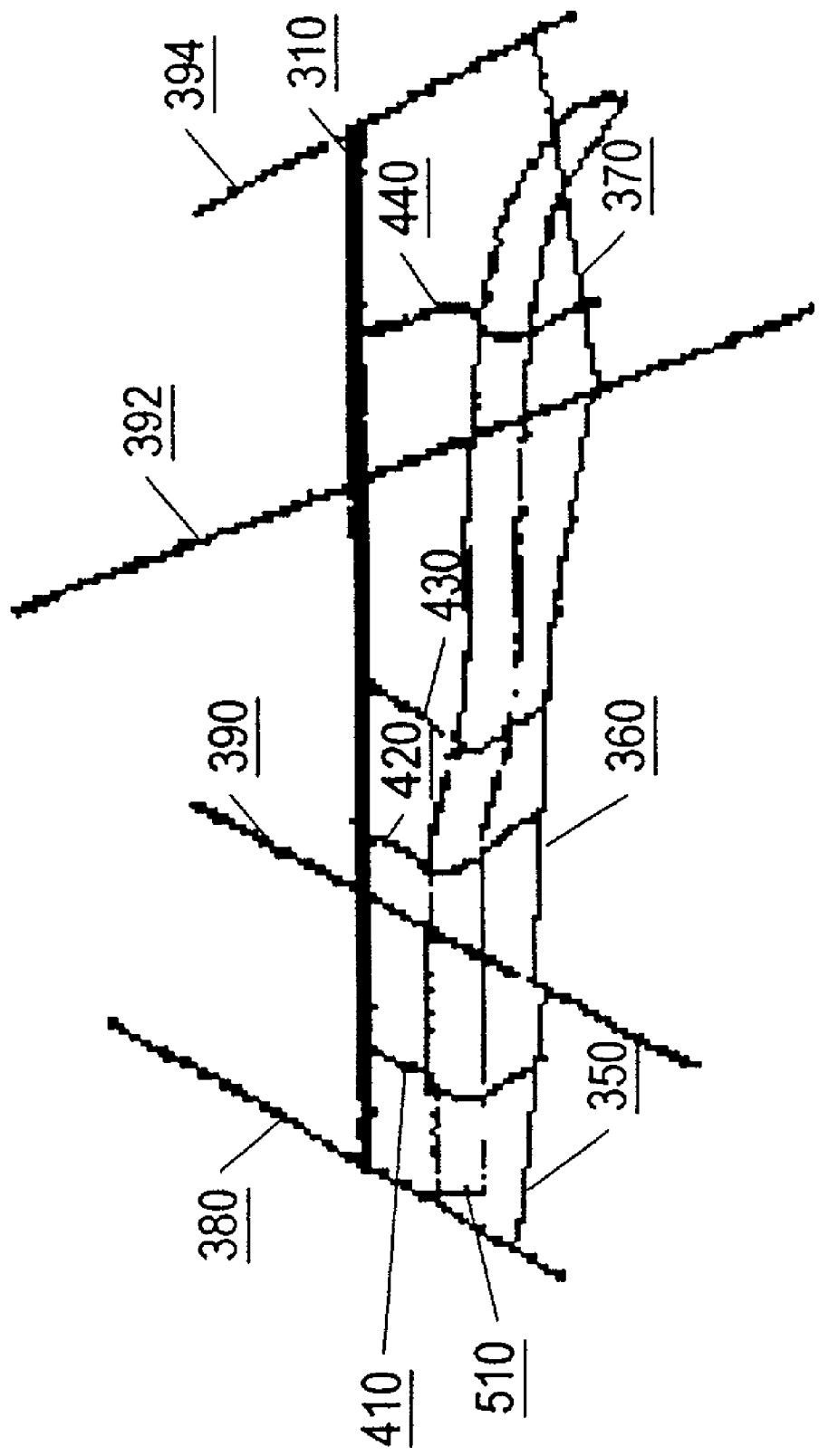
FIG. 5B is a sectional view from a three dimensional model in which a fluvial channel is modeled in the paleo-space based on the transform from FIG. 4, in accordance with one implementation of the present invention.

After transforming to paleo space, a geological body can be manually defined. More specifically, referring to FIG. 5A, an embodiment of the present invention illustrated in a flow diagram. As shown block 520 provides for selecting a geological body type. Block 530 provides for setting parameters that define the shape of the geological body. Block 540 provides for positioning the geological body in relation to block units and ancillary data in the paleo structural model. Alternatively, the geological body may be stochastically defined, such as by using Monte Carlo techniques. Geological bodies may also be created in the paleo-model by generating sets of objects that conform to a selected probability distribution. FIG. 5B depicts a structural model of a fluvial channel 510 in the paleo-space.

Figure 6A:
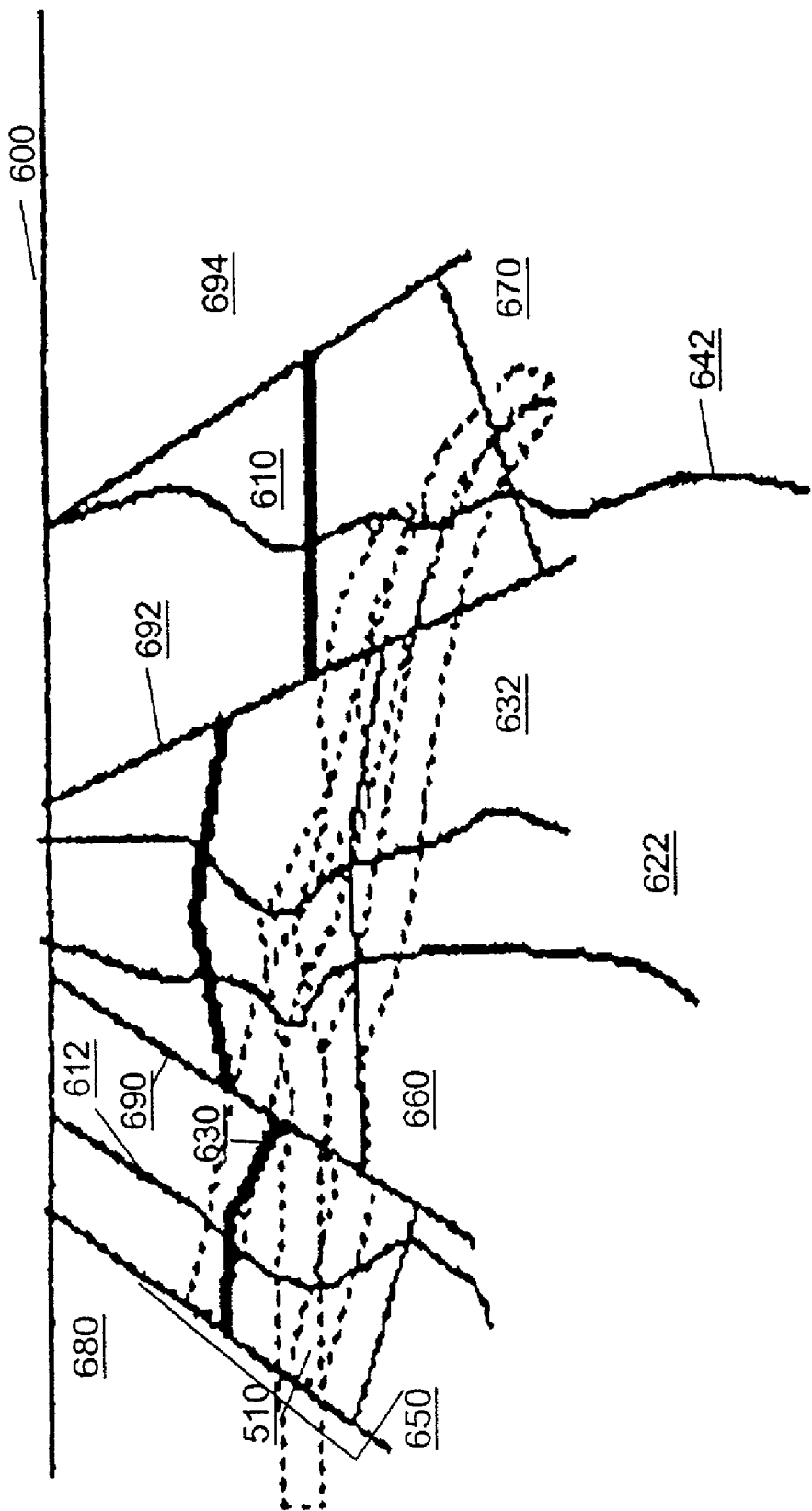
FIGS. 6A, 6B and 6C are sectional views from a three dimensional model in which inverse paleo-transforms are applied to the geological body of FIG. 5 using copies of a fluvial channel, in accordance with one implementation of the present invention.
Figure 6B:
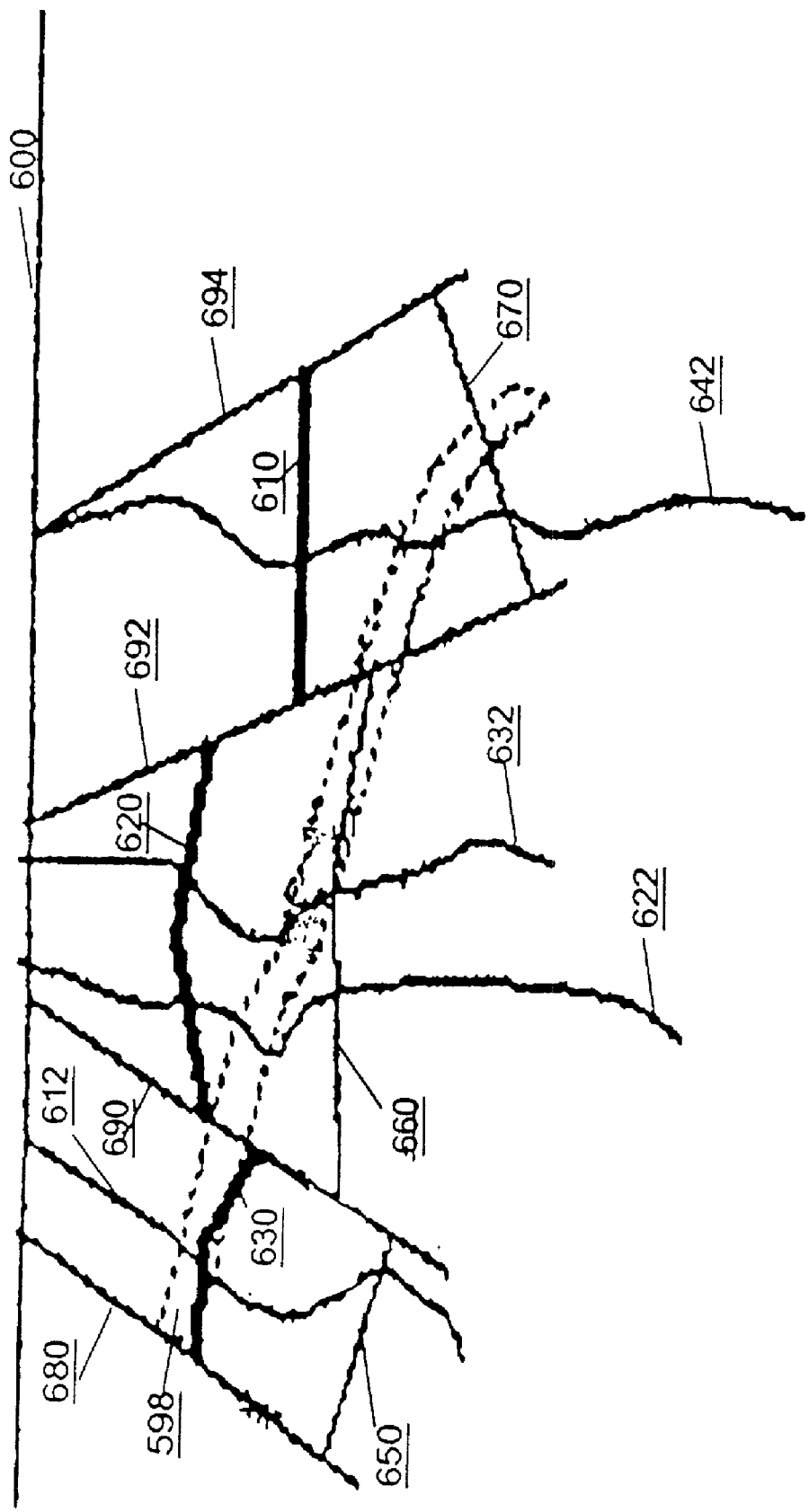
Figure 6C:
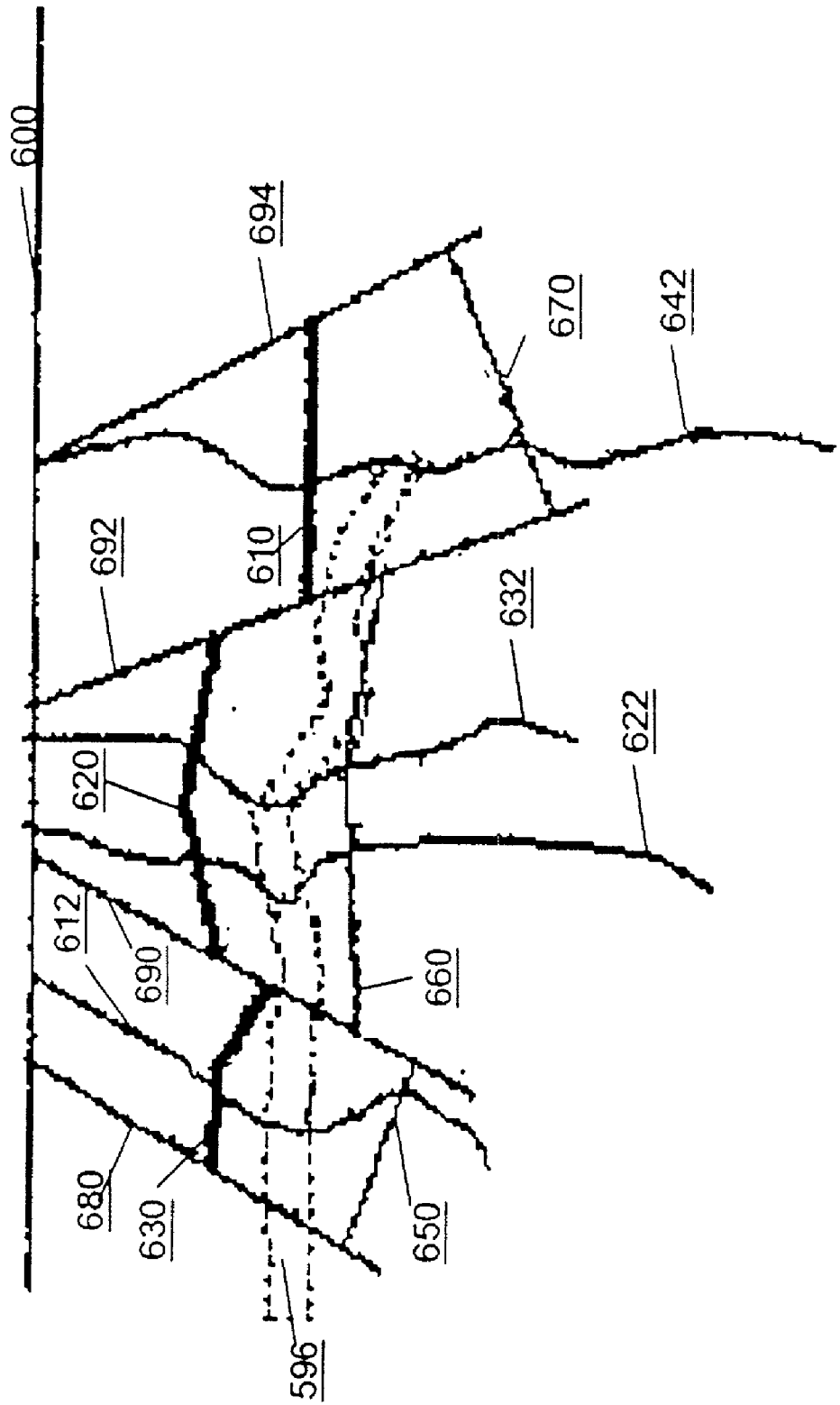

Referring now to FIGS. 6A, 6B and 6C, section views illustrate applying inverse paleo-transform(s) to three dimensional geological bodies. FIG. 6A shows the inverse paleo-transform using fluvial channel 510. FIG. 6B shows the inverse paleo-transform using a copy of fluvial channel 510, shown as fluvial channel 598. FIG. 6C shows the inverse paleo-transform using another copy of fluvial channel 510, shown as fluvial channel 596.

The inverse paleo-transforms apply to each geological body constructed. According to an embodiment, a method directs determining a set of block units containing the geological body in paleo space and, for each block unit, constructing a copy of the closed geological body bounding surface. The method further directs applying an inverse paleo-transform for the block unit to all of the points in the copied surface (interpolating the transform may be necessary).

Figure 7:
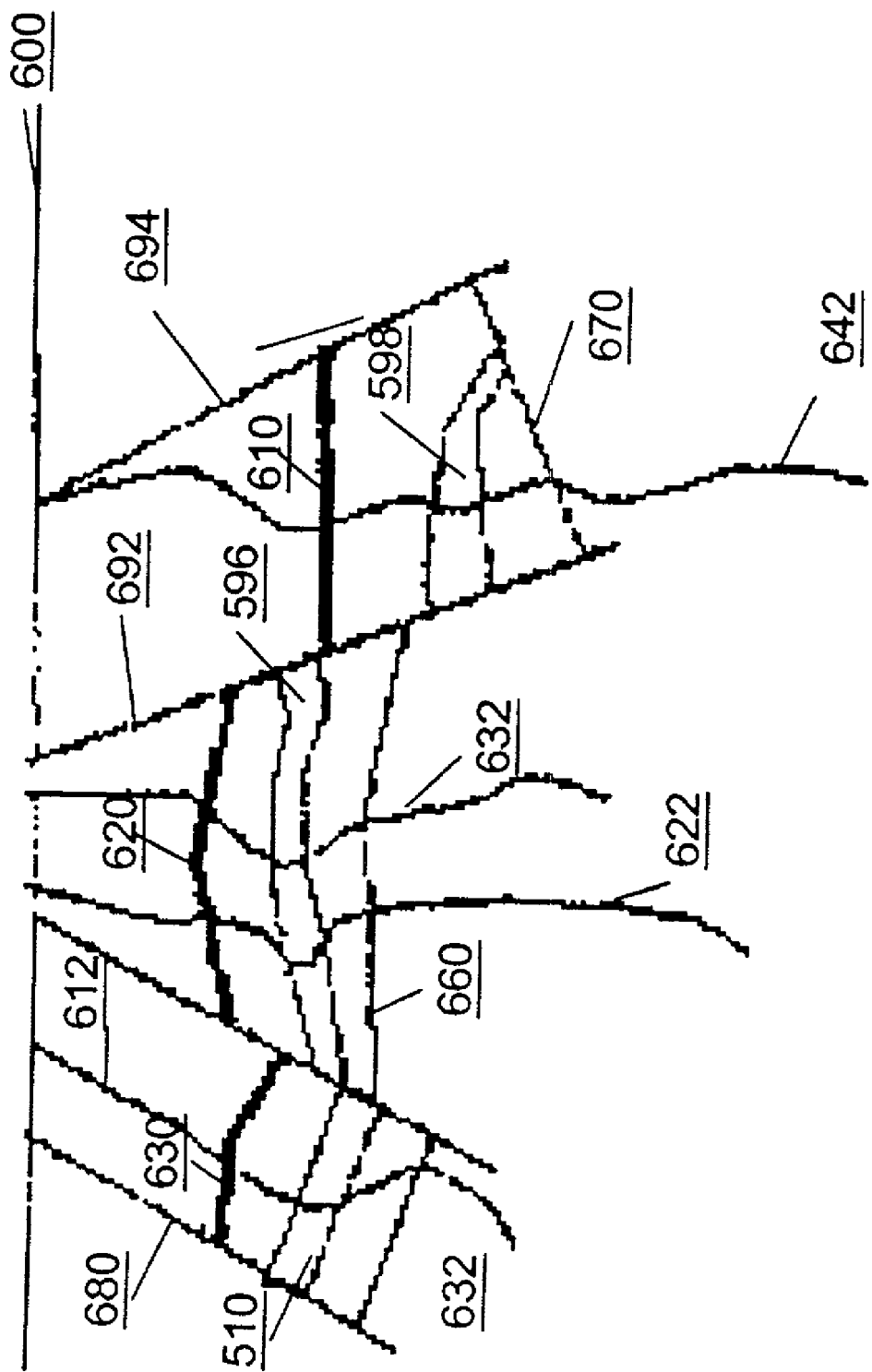
FIG. 7 is a sectional view from a three dimensional model in which the inverse transformed bounding surface of FIG. 6 is clipped to fit in the block unit representation in the contemporary space model, in accordance with one implementation of the present invention.

Referring now to FIG. 7, a geological body in a contemporary space model is shown that results from collecting "clipped pieces" for one geometry feature. More particularly, according to the method, the inverse paleo-transformed bounding surface shown in each of FIGS. 6A, 6B and 6C is trimmed to fit in the block unit representation in the contemporary space model by performing an intersection operation that is destructive to the copied, inverse transformed boundary surface, but is non-destructive to the block unit representation. The resulting clipped pieces are finally collected in one geometry feature that represents the geological body in the contemporary space model, as shown in FIG. 7. Referring to FIGS. 6A, 6B and 6C and FIG. 7 together, portions of the different channels shown in each of FIGS. 6A, 6B and 6C are shown in FIG. 7. More particularly, FIG. 7 shows in the right block unit, the first portion of fluvial channel 510 from FIG. 6A. The middle block unit of FIG. 7 shows the middle portion of fluvial channel 596 from FIG. 6C. The left block unit of FIG. 7 shows the left portion of fluvial channel 598 from FIG. 6B.

As noted above, the illustrative embodiment provides three different transforms associated with each volume v in the model for flattening onto a horizon surface, depending upon the extent of the deformation. For Case 1, an invertible bulk paleo-transformation $T(v)$ is used which translates and rotates the best fit plane of the portion of the datum horizon that bounds the volume v to the z=0 plane, where v is bounded by a horizon, such as 310 in FIG. 3. In this case, the transformations are applied in bulk, that is, the same transformation vector is applied to every point in or on the boundary of volume v. For Case 2, an invertible transformation is used which is a two-dimensional scalar field: $T(v,x,y)=<0, 0, T(v,x,y)>$, which translates every point of the portion of the datum horizon that bounds the volume v to the z=0 plane, where v is bounded by a horizon, (H) and $T(v2,x,y)=T(v,x,y)$ if volume v2 (not bounded by H) is above or below volume v. In this case, the transformation and its inverse both apply the transformation vector point-by-point on each of the spatial data points (e.g., triangle or quadruple corners, borehole survey points, well marker positions), thereby defining the entities to be transformed. For Case 3, the paleo-transform is $T(x,y,z)$ and may be unique for every point in or on the boundary of volume v. The inverse ($T-1(v)$) of the bulk transform can be used without forcing the geological objects to conform to the localized shape of the datum surface; alternatively, the geological object can be made to conform to the localized shape of the datum surface in the contemporary model by using the surface conformance algorithm, in which each vertex is translated in z by a quantity deltaZ=(Wtop*deltaztop)+(Wbottom*deltazbottom), where Wtop andwbottom are weights and deltaztop=Ztop−MeanZTop, deltazbottom=Zbottom−MeanZbottom. Ztop and Zbottom are derived by projecting a ray vertically from the given vertex until it hits the top or bottom conformal surfaces, respectively. MeanZtop and meanzbottom are, respectively, the mean values of the top and bottom conformal surfaces. This is the same technique used to force geological objects to folded surfaces when they are modeled in individual block units in contemporary space.

One of skill in the art with the benefit of this disclosure will appreciate that embodiments of the present invention are not limited to the transformations discussed above. The general case supported by this invention involves two three dimensional vector fields defining the forward and backward transformations independently for each volume in the model: $Tp(v,x,y,z)$, a unique transformation vector defined at every point in or on volume v in the contemporary model to define the transformation of that point into paleo space; and $Tc(v,x',y',z')$, and a different transformation vector defined at every point in or on the representation of volume v in the paleo space structural model to describe the inverse transformation of that point back into contemporary space. Such transformations and inverse paleo-transformations can be defined so that they are independent of the volume v and recorded in a 3 D grid. Inverse transformations are again applied point-by-point. Such vector fields can be defined to minimize distortions to certain attributes of the contemporary model, such as the area of the datum surface or the volume of the volumetric entities bounded by the datum surface. The computation of such transforms is beyond the scope of the present disclosure.

Figure 8:
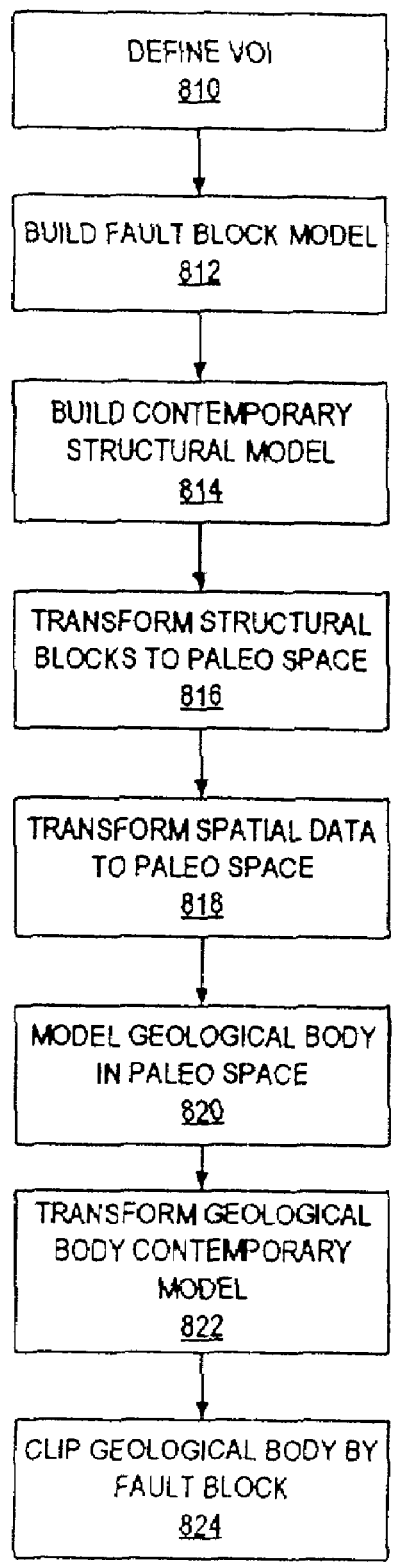
FIG. 8 is a flow diagram illustrating the logical flow according an exemplary implementation of the present invention.

The invention may be further understood with reference to the flow diagram of FIG. 8, which illustrates the logical flow according to an exemplary implementation. The volume of interest (VOI) is first defined within the geologic region as shown in block 810. A fault block model is then built as shown in block 812, and the contemporary structural model created as shown in block 814. The structural blocks are transformed to the original depositional paleo space in block 816, and the same function is used to transform the spatial data as shown in block 818. One or more geological bodies are then modeled in the paleo-space as shown in block 820. An inverse transform function operates on the geological bodies to bring them into the contemporary model as shown in block 822. In the contemporary model, the geological bodies are trimmed, or fit to size, according to the respective fault blocks as shown in block 824.

Figure 9:
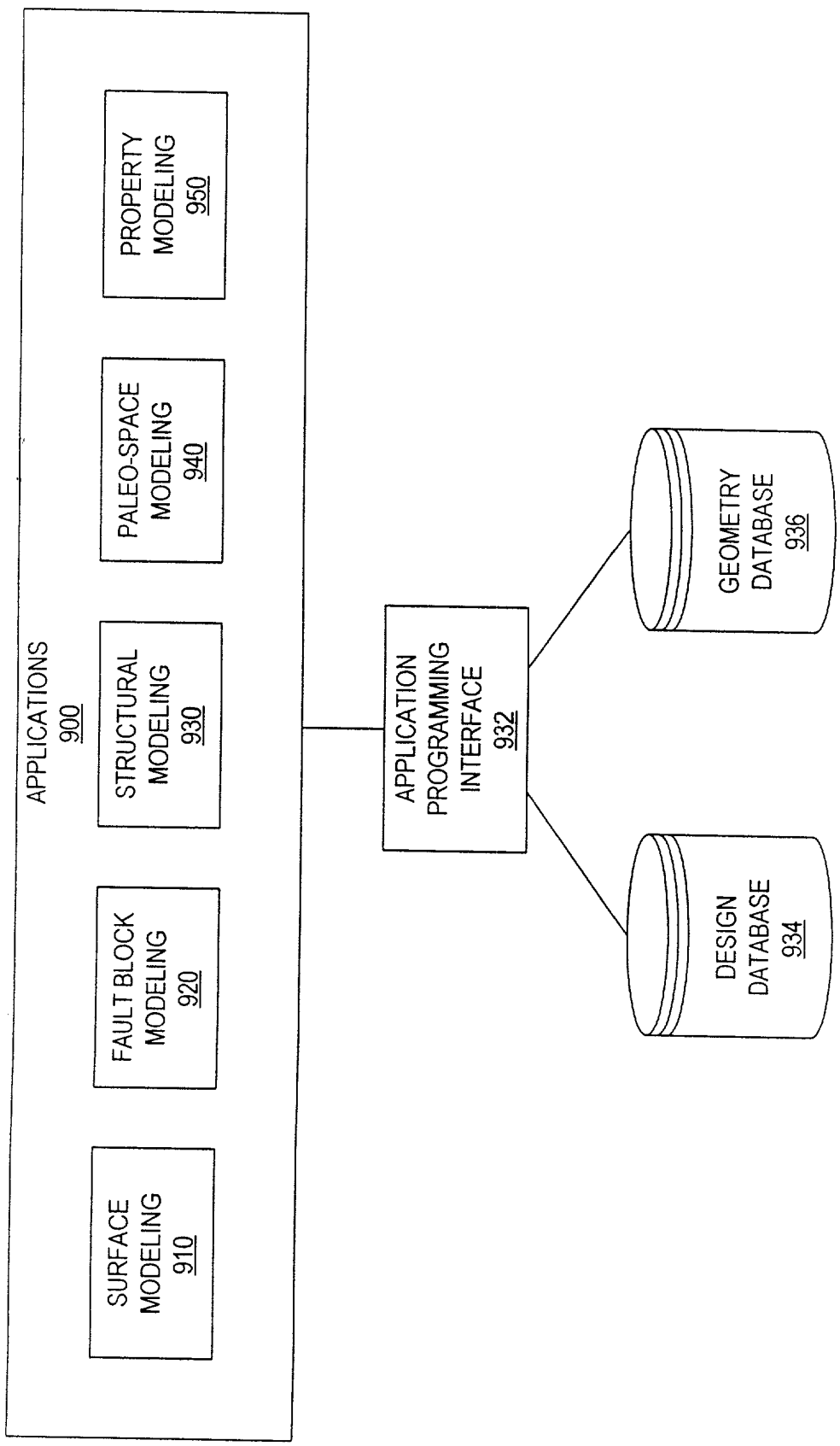
FIG. 9 is a block diagram of one embodiment of a data processing system adapted to carry out the present invention.

FIG. 9 depicts one embodiment of a data processing system adapted to carry out the present invention. The system includes an application layer 900 that provides one or more tools to carry out the various foregoing steps. Application layer 900 communicates with two databases 934 and 936 via an application programming interface (API) 932. The application 900 allows the users, such as geologists, geophysicists and petroleum engineers, to construct and interact with the geoscience model using terms from those disciplines rather than terms from the science of mathematics. For example, the application allows the users to refer to horizons, faults, salt domes and other application entities. For each application entity, the application allows the users to interact with the geoscience model concerning a number of properties, including, for example, geometric properties such as (shape, size and location) and material properties (such as porosity, velocity and density).

Database 936 is referred to as a geometry database or model (the database being a physical representation of the model), and may contain three principle kinds of information for each feature: a shape description of every feature, which is represented by sets of sub-regions and boundaries, a topology description specifying how the sub-regions and boundaries connect to another, and a description of the material properties within each subregion and on each boundary of the model. All geometric database data associated with a feature can be accessed knowing the feature's name. The geometry database is based on a commercially available geometry engine, the SHAPES geometric modeling system by XOX Corporation, now supported and distributed by GeoSmith Company. Database 934 is referred to as a design database or model, and stores all data pertinent to a feature not stored in the geometry database. All design database data associated with a feature can be accessed knowing the feature's name. The Schlumberger Technology Corporation Data Model, which is implemented by Schlumberger Inc.'s GEOFRAME geoscience interpretation system, performs such a function. The design database can be used as a stand-alone system by non-geometric applications. All data in the design database is in a system-specified format and is readable by any application using system services. Preferably, the system complies with the Petrotechnical Open Systems Consortium, ("POSC") EpiCentre data model. An example of such a system is Geoframe™.

By associating a paleo-transformation with each volume entity in the contemporary model, the present invention preserves the topology of the volume entities, and consistently transforms all data positioned on or in the volume entities when transforming from contemporary to paleo-space. Similarly, the inverse transform associated with each volume consistently transforms all geological objects modeled in paleo space which are partially contained in the volume entity. The result is a more accurate characterization of these objects in deformed regions built with a more efficient set of user interactions.

Figure 10:
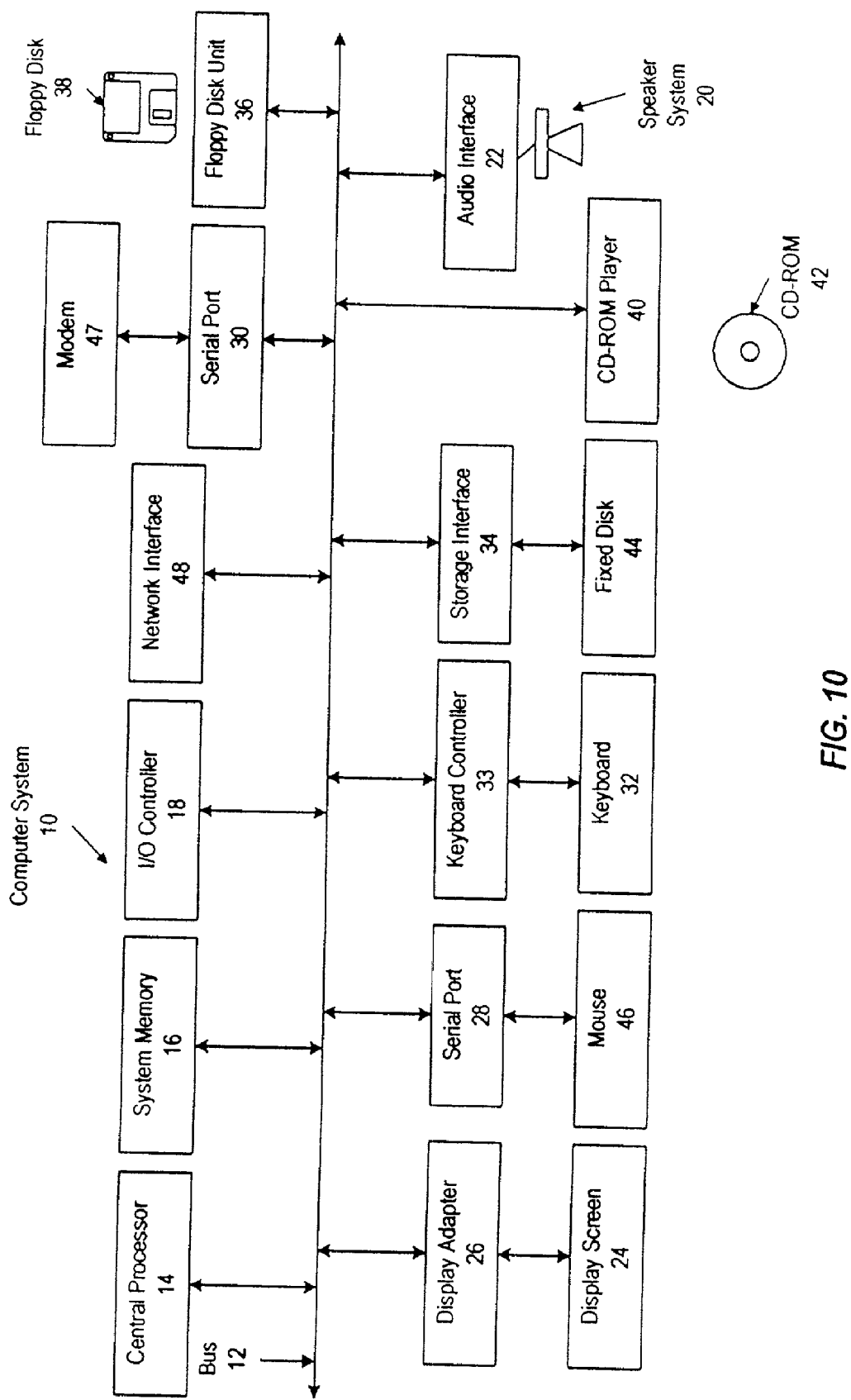
FIG. 10 is a block diagram of a computer system appropriate for implementing at least a portion of one or more of the embodiments of the present invention.

FIG. 10 depicts a block diagram of a computer system 10 suitable for implementing at least a portion of the present invention. Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk unit 36 operative to receive a floppy disk 38, and a CD-ROM player 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12). As will be appreciated, computer system 10, if implemented in a hand-held device will have limited space for each component described above, and will be independent of many of the devices herein described.

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Application programs resident with computer system 10 are generally stored on and accessed via a computer readable medium, such as a hard disk drive (e.g., fixed disk 44), an optical drive (e.g., CD-ROM player 40), floppy disk unit 36 or other storage medium. Additionally, application programs may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Those skilled in the art will also appreciate that embodiments disclosed herein may be implemented as software program instructions capable of being distributed as one or more program products, in a variety of forms including computer program products, and that the present invention applies equally regardless of the particular type of program storage media or signal bearing media used to actually carry out the distribution. Examples of program storage media and signal bearing media include recordable type media such as floppy disks, CD-ROM, and magnetic tape, and transmission type media such as digital and analog communications links, as well as other media storage and distribution systems.

Additionally, the foregoing detailed description has set forth various embodiments of the present invention via the use of block diagrams, flowcharts, and/or examples. It will be understood by those skilled within the art that each block diagram component, flowchart step, and operations and/or components illustrated by the use of examples can be implemented, individually and/or collectively, by a wide range of hardware, software, firmware, or any combination thereof. The present invention may be implemented as those skilled in the art will recognize, in whole or in part, in standard Integrated Circuits, Application Specific Integrated Circuits (ASICs), as a computer program running on a general-purpose machine having appropriate hardware, such as one or more computers, as firmware, or as virtually any combination thereof and that designing the circuitry and/or writing the code for the software or firmware would be well within the skill of one of ordinary skill in the art, in view of this disclosure.

Although particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Thus, the embodiments of the present invention described above are exemplary and the scope of the invention should, therefore, be determined not with reference to the above description, but instead should be determined with reference to the appended claims along with their full scope of equivalents.

What is claimed is:

1. A method of modeling a geological body with a lateral extent spanning a plurality of fault blocks in a contemporary formation, wherein a fault block of the plurality of fault blocks comprises a plurality of block units, the method comprising:

using a computer performing the steps of:
transforming a block unit of the plurality of block units from contemporary space to paleo-space to generate a transformed block unit;
constructing the geological body using data acquired from the contemporary formation in a depositional paleo-space model having the transformed block unit, wherein the geological body intersects at least the transformed block unit;
making a copy of the geological body;
transforming the copy from paleo-space to contemporary space based on a deformation model of the contemporary formation, wherein transforming the copy generates a portion of a model of the geological body in contemporary space;

trimming the portion of the model to fit the block unit of the contemporary formation; and storing the portion of the model.

2. The method of claim 1 wherein transforming the copy further includes inverse paleo-transforming a boundary surface.

3. The method of claim 1 wherein trimming the portion further includes performing an intersection operation that is destructive to a copied, inverse transformed boundary surface and non-destructive to the block unit.

4. The method of claim 1 wherein transforming the copy uses at least one selected from a group consisting of a paleo transform, an inverse paleo transform, a paleo transform matrix, an inverse paleo transform matrix, a point-by-point application of a paleo transform, and a point-by-point transform of an inverse paleo transform.

5. The method of claim 1 wherein constructing the geological body in the depositional paleo-space model includes building a fault block model using the acquired data.

6. The method of claim 1 wherein constructing the geological body in the depositional paleo-space model includes building a contemporary structure model based on a fault block model.

7. The method of claim 1 wherein transforming the copy utilizes an inverse transform based on the transformed block unit.

8. A system for modeling a geological body in deformed formations, the system comprising:

an applications module adapted to:

transform a block unit of a plurality of block units of a contemporary formation from contemporary space to paleo-space to generate a transformed block unit, wherein the contemporary formation includes the geological body, and wherein the geological body spans a plurality of fault blocks in the contemporary formation, and wherein a fault block of the plurality of fault blocks comprises the plurality of block units, transform from contemporary space to paleo-space a graphical representation of ancillary spatial data representing the geological body, construct the geological body using the transformed graphical representation in a depositional paleo-space model having the transformed block unit, wherein the geological body intersects at least the transformed block unit, make a copy of the geological body, and transform the copy from paleo-space to contemporary space based on a deformation model of the contemporary formation to generate a portion of a model of the geological body in contemporary space;

an application programming interface coupled to the applications module for trimming the portion of the model to fit the block unit of the contemporary formation, the application programming interface adapted for input/output manipulation;

a design database adapted to provide a plurality of tools for the input/output manipulation;

a geometry database coupled to the application programming interface; and a processor operatively connected to the applications module.

9. The system of claim 8 wherein the depositional paleo-space model is unfaulted and unfolded.

10. The system of claim 8 wherein the applications module further comprises:

a fault block modeling object; and a structural modeling object, wherein the applications module is operable with the application programming interface to allow a user to choose via the fault block modeling object an order of fault insertion, the order of insertion determining how the structural modeling object inserts horizon and unconformity patches into fault blocks created by the fault block modeling object.

11. An apparatus for modeling a geological body having a lateral extent spanning a plurality of fault blocks in a contemporary formation, wherein a fault block of the plurality of fault blocks comprises a plurality of block units, the apparatus comprising:

a processor;

means for transforming a block unit of the plurality of block units from contemporary space to paleo-space to generate a transformed block unit;

means for constructing the geological body in an original depositional paleo-space model having the transformed block unit, wherein the geological body intersects at least the transformed block unit;

means for making a copy of the geological body;

means for transforming the copy from paleo-space to contemporary space based on a deformation model of the contemporary formation, wherein transforming the copy generates a portion of a model of the geological body in contemporary space;

means for trimming the portion of the model to fit the block unit; and means for storing the portion of the model.

12. A method for modeling a geological body in a deformed formation, the method comprising:

using a computer performing the steps of:

transforming a block unit of a plurality of block units of a contemporary formation from contemporary space to paleo-space to generate a transformed block unit, wherein the geological body spans a plurality of fault blocks in the contemporary formation, and wherein a fault block of the plurality of fault blocks comprises the plurality of block units;

copying a graphical representation of ancillary spatial data representing the geological body;

transforming the copy of the graphical representation from contemporary space to paleo-space using a spatial paleo-transform;

recording the spatial paleo-transform at predetermined points;

constructing the geological body in a paleo-space model having the transformed block unit using the transformed graphical representation, wherein the geological body intersects at least the transformed block unit;

inverse transforming the geological body from paleo-space to contemporary space, wherein inverse transforming generates a portion of a model of the geological body in contemporary space;

trimming the portion of the model to fit in the block unit; and storing the portion of the model.

13. An apparatus for modeling a geological body in faulted formations, the apparatus comprising:

a processor;

means for transforming a block unit of a plurality of block units of a contemporary formation from contemporary space to paleo-space to generate a transformed block unit, wherein the geological body spans a plurality of fault blocks in the contemporary formation, and wherein a fault block of the plurality of fault blocks comprises the plurality of block units;

means for copying a graphical representation of ancillary spatial data representing the geologic body;

means for transforming the copy of the graphical representation from contemporary space to paleo-space using a spatial paleo-transform;

means for recording the spatial paleo-transform at predetermined points;

means for constructing the geological body in a paleo-space model having the transformed block unit using the transformed graphical representation, wherein the geological body intersects at least the transformed block unit;

means for inverse transforming the geological body from paleo-space to contemporary space, wherein the inverse transforming generates a portion of a model of the geological body in contemporary space;

means for trimming the portion of the model to fit in the block unit; and means for storing the portion of the model.

14. A computer recordable media having executable instructions recorded thereon to model a geological body, the instructions causing a computer processor to execute steps, comprising:

transforming a block unit of a plurality of block units of a contemporary formation from contemporary space to paleo-space to generate a transformed block unit, wherein the geological body spans a plurality of fault blocks in the contemporary formation, and wherein a fault block of the plurality of fault blocks comprises the plurality of block units;

copying a graphical representation of ancillary spatial data representing the geological body;

transforming the copy of the graphical representation from contemporary space to paleo-space using a spatial paleo-transform;

recording the spatial paleo-transform at predetermined points;

constructing the geological body in a paleo-space model having the transformed block unit using the transformed graphical representation, wherein the geological body intersects at least the transformed block unit;

inverse transforming the geological body from the paleo-space model to contemporary space, wherein inverse transforming generates a portion of a model of the geological body in contemporary space;

trimming the portion of the model to fit in the block unit; and storing the portion of the model.

15. A method for modeling a geological body in a contemporary formation spanning a plurality of fault blocks, comprising:

using a computer performing the steps of:

obtaining a structural model of the contemporary formation comprising a first block unit and a second block unit, wherein the geological body spans at least the first block unit and the second block unit, and wherein a fault block of the plurality of fault blocks comprises the first block unit and the second block unit;

transforming a measurement of the geological body from contemporary space to paleo-space to generate a transformed measurement;

transforming the first block unit from contemporary space to paleo-space to generate a first transformed block unit;

constructing the geological body in paleo-space using the transformed measurement, wherein the geological body intersects the first transformed block unit in paleo-space;

generating a first copy of a bounding surface of the geological body in paleo-space;

inverse transforming the first copy of the bounding surface from paleo-space to contemporary space to generate a first portion of a model of the geological body in contemporary space;

trimming the first portion of the model to fit in the first block unit, wherein the trimming uses an intersection operation that is destructive to the first copy of the bounding surface; and storing the first portion of the model.

16. The method of claim 15, wherein constructing the geological body uses Monte Carlo techniques.

17. The method of claim 15, wherein the measurement is at least one selected from a group consisting of a seismic measurement, a drilling measurement, a wireline sensor measurement, and a wireline log measurement.

18. The method of claim 15, the steps further comprising:

transforming the second block unit from contemporary space to paleo-space to generate a second transformed block unit, wherein the geological body intersects the second transformed block unit in paleo-space;

generating a second copy of the bounding surface for the second transformed block unit;

inverse transforming the second copy of the bounding surface from paleo-space to contemporary space to generate a second portion of the model; and trimming the second portion to fit in the second block unit.

19. The method of claim 18, wherein transforming the first block unit and transforming the second block unit use identical transformations.

* * * * *